(12) United States Patent
Cao et al.

(10) Patent No.: US 12,535,609 B2
(45) Date of Patent: Jan. 27, 2026

(54) METHODS AND SYSTEMS FOR ACCURATE WELL-SEISMIC TIE BASED ON STEPWISE MATCHING AND OPTIMIZATION

(71) Applicant: SOUTHWEST PETROLEUM UNIVERSITY, Sichuan (CN)

(72) Inventors: Weiping Cao, Chengdu (CN); Mengcheng Li, Chengdu (CN); Xuri Huang, Chengdu (CN); Shuhang Tang, Chengdu (CN); Ran Yang, Chengdu (CN); Luo Li, Chengdu (CN); Moyan Li, Chengdu (CN); Ranran Yang, Chengdu (CN); Siyao Li, Chengdu (CN); Xinwang Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 407 days.

(21) Appl. No.: 18/338,281

(22) Filed: Jun. 20, 2023

(65) Prior Publication Data

US 2024/0411040 A1    Dec. 12, 2024

(30) Foreign Application Priority Data

Jun. 12, 2023   (CN) ........................ 202310697274.X

(51) Int. Cl.
*G01V 1/36* (2006.01)
*G01V 1/28* (2006.01)
(Continued)

(52) U.S. Cl.
CPC .............. *G01V 1/366* (2013.01); *G01V 1/282* (2013.01); *G01V 13/00* (2013.01); *G01V 11/00* (2013.01); *G01V 2210/614* (2013.01)

(58) Field of Classification Search
USPC ......................................................... 702/14
See application file for complete search history.

(56) References Cited

U.S. PATENT DOCUMENTS

| 7,668,042 B2 * | 2/2010 | Robinson | G01V 1/40 |
| | | | 367/27 |
| 2008/0285383 A1 * | 11/2008 | An | G01V 1/28 |
| | | | 367/38 |

(Continued)

*Primary Examiner* — Paul D Lee
(74) *Attorney, Agent, or Firm* — METIS IP LLC

(57) ABSTRACT

The present disclosure provides a method for an accurate well-seismic tie based on stepwise matching and optimization, including: determining target seismic data as a seismic trace near well and performing first data processing on the target seismic data; performing second data processing on the logging information to determine a reflection coefficient sequence; extracting seismic wavelets, convoluting the seismic wavelets with the reflection coefficient sequence, determining a synthetic seismic record of the target calibration object in a time domain, performing third data processing on the synthetic seismic record; determining a correlation between the seismic trace near well and the synthetic seismic record, determining a global time shift between the synthetic seismic record and the seismic trace near well, performing a preliminary alignment on the synthetic seismic record; and calculating a local time shift between the seismic trace near well and the synthetic seismic record and accurately calibrating the synthetic seismic record.

20 Claims, 8 Drawing Sheets

(51) Int. Cl.
  *G01V 13/00* (2006.01)
  *G01V 11/00* (2006.01)

(56) References Cited

U.S. PATENT DOCUMENTS

| | | | |
|---|---|---|---|
| 2014/0039799 A1* | 2/2014 | Krohn | G01V 1/368 |
| | | | 702/14 |
| 2018/0292552 A1* | 10/2018 | Ramsay | G01V 1/50 |
| 2018/0372901 A1* | 12/2018 | Wang | G01V 1/48 |
| 2019/0034812 A1* | 1/2019 | Borrel | G06N 20/00 |
| 2020/0200935 A1* | 6/2020 | Ray | G01V 1/306 |

\* cited by examiner

200

Based on seismic data and logging information, determining target seismic data as a seismic trace near well and performing first data processing on the target seismic data ⟶ 210

Performing, based on a target calibration object, second data processing on the logging information to determine a reflection coefficient sequence ⟶ 220

Extracting seismic wavelets from the seismic trace near well, convoluting the seismic wavelets with the reflection coefficient sequence, determining a synthetic seismic record of the target calibration object in a time domain, and performing third data processing on the synthetic seismic record ⟶ 230

Determining, through a first preset algorithm, a correlation between the seismic trace near well and the synthetic seismic record, determining a global time shift between the synthetic seismic record and the seismic trace near well, and performing a preliminary alignment on the synthetic seismic record through the global time shift ⟶ 240

Calculating a local time shift between the seismic trace near well and the synthetic seismic record through a second preset algorithm, and accurately calibrating the synthetic seismic record through the local time shift ⟶ 250

FIG. 2

METHODS AND SYSTEMS FOR ACCURATE WELL-SEISMIC TIE BASED ON STEPWISE MATCHING AND OPTIMIZATION

CROSS-REFERENCE TO RELATED APPLICATION

This application claims the priority of the Chinese Patent Application No. 202310697274.X, filed on Jun. 12, 2023, the entire contents of which are incorporated herein by reference.

TECHNICAL FIELD

The present disclosure relates to the field of oil and gas exploration, and in particular, to a method and a system for an accurate well-seismic tie based on stepwise matching and optimization.

BACKGROUND

In the field of oil and gas exploration, a well-seismic tie, as one of the key steps in seismic data interpretation and reservoir prediction, is of great importance. The current well-seismic tie is divided into manual calibration methods and automatic calibration methods. Manual calibration introduces subjective factors of interpreters, with uneven levels of accuracy and low efficiency. Automatic calibration also requires manual participation and is susceptible to noisy data and large errors.

In order to balance the accuracy and efficiency of a well-seismic tie, CN109932749B proposes a method for a well-seismic tie to calibrate multiple wells in the study area according to a well time-depth relationship of the wells to be calculated, but the method is still a global matching and does not involve an effective combination of global adjustment and local fine adjustment of calibration results, and its accuracy still needs to be optimized.

Therefore, it is desired to provide a method and a system for an accurate well-seismic tie based on stepwise matching and optimization, which can realize an intelligent and efficient well-seismic tie, improve the accuracy and stability of calibration results, effectively enhance the calibration efficiency while ensuring the calibration accuracy, and avoid the inefficiency of manual calibration and the error of automatic calibration.

SUMMARY

One or more embodiments of the present disclosure provide a method for an accurate well-seismic tie based on stepwise matching and optimization. The method is implemented by a processor and includes: based on seismic data and logging information, determining target seismic data as a seismic trace near well and performing first data processing on the target seismic data; performing, based on a target calibration object, second data processing on the logging information to determine a reflection coefficient sequence; extracting seismic wavelets of the seismic trace near well, convoluting the seismic wavelets with the reflection coefficient sequence, determining a synthetic seismic record of the target calibration object in a time domain, and performing third data processing on the synthetic seismic record; determining, through a first preset algorithm, a correlation between the seismic trace near well and the synthetic seismic record, determining a global time shift between the synthetic seismic record and the seismic trace near well, and performing a preliminary alignment on the synthetic seismic record through the global time shift; and calculating a local time shift between the seismic trace near well and the synthetic seismic record through a second preset algorithm, and accurately calibrating the synthetic seismic record through the local time shift.

One or more embodiments of the present disclosure provide a system for an accurate well-seismic tie based on stepwise matching and optimization, including: based on seismic data and logging information, a first determination module configured to determine target seismic data as a seismic trace near well, and perform first data processing on the target seismic data; a second determination module configured to perform, based on a target calibration object, second data processing on the logging information to determine a reflection coefficient sequence; a third determination module configured to extract seismic wavelets of the seismic trace near well, convoluting the seismic wavelets with the reflection coefficient sequence, determine a synthetic seismic record of the target calibration object in a time domain, and perform third data processing on the synthetic seismic record; a preliminary alignment module configured to determine, through a first preset algorithm, a correlation between the seismic trace near well and the synthetic seismic record, determine a global time shift between the synthetic seismic record and the seismic trace near well, and perform a preliminary alignment on the synthetic seismic record through the global time shift; and an accurate calibration module configured to calculate a local time shift between the seismic trace near well and the synthetic seismic record through a second preset algorithm, and accurately calibrate the synthetic seismic record through the local time shift.

One or more embodiments of the present disclosure provide non-transitory computer-readable storage medium, wherein the storage medium stores computer instructions, and when a computer reads the computer instructions in the storage medium, the computer implements the method for an accurate well-seismic tie based on stepwise matching and optimization.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is an exemplary flowchart of a method for an accurate well-seismic tie based on stepwise matching and optimization according to some embodiments of the present disclosure;

DETAILED DESCRIPTION

Figure 1:
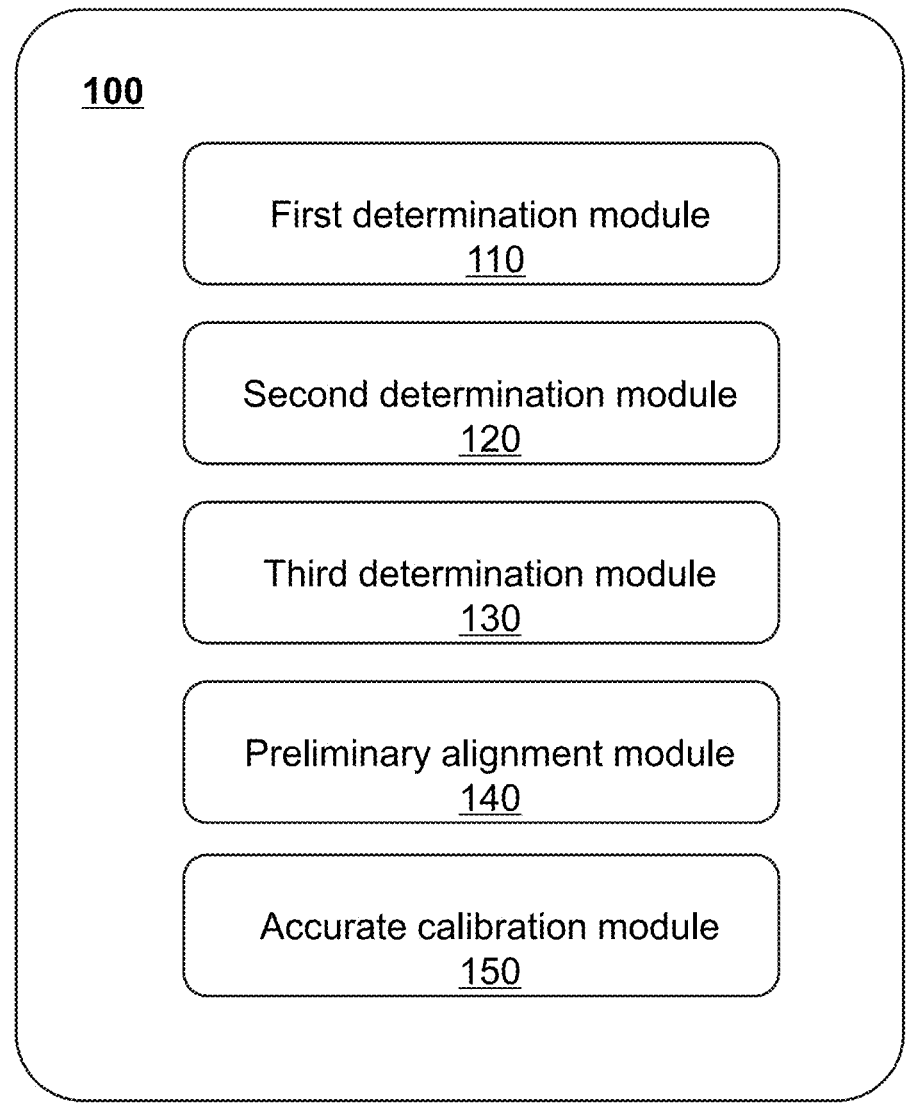
FIG. 1 is a schematic diagram of modules of a system for an accurate well-seismic tie based on stepwise matching and optimization according to some embodiments of the present disclosure.

In order to more clearly illustrate technical solutions of embodiments of the present disclosure, the following provides a brief description of accompanying drawings that need to be used in the description of the embodiments. Obviously, the accompanying drawings below are only some examples or embodiments of the present disclosure, and those skilled in the art may apply the present disclosure to other similar scenarios according to these accompanying drawings without creative effort. Unless obviously obtained from the context or the context illustrates otherwise, the same numeral in the drawings refers to the same structure or operation.

It should be understood that terms "system," "device," "unit," and/or "module" as used herein are used to distinguish different components, elements, parts, sections, or assemblies at different levels. However, the terms may be displaced by other expressions if they achieve the same purpose.

As indicated in the present disclosure and the claims, the terms "a", "an", "one" and/or "the" are not specific to the singular and may include the plural unless the context clearly indicates an exception. In general, the terms "including" and "comprising" suggest only an inclusion of clearly identified steps and elements that do not constitute an exclusive list, and the method or apparatus may also contain other steps or elements.

Flowcharts are used throughout the present disclosure to illustrate operations performed by the system according to the embodiments of the present disclosure. It should be understood that the previous or subsequent operations may not be accurately implemented in order. Instead, each step may be processed in reverse order or simultaneously. Moreover, one or more other operations may be added to the flowcharts, and one or more operations may be removed from the flowcharts.

FIG. 1 is a schematic diagram of modules of a system for an accurate well-seismic tie based on stepwise matching and optimization according to some embodiments of the present disclosure.

As shown in FIG. 1, a system 100 for an accurate well-seismic tie based on stepwise matching and optimization may include a first determination module 110, a second determination module 120, a third determination module 130, a preliminary alignment module 140, and an accurate calibration module 150.

The first determination module 110 may be configured to determine target seismic data as a seismic trace near well based on seismic data and logging information and perform first data processing on the target seismic data.

The first determination module 110 may also be configured to calculate, based on well coordinates and nearby seismic trace coordinates, a Euclidean distance between the well coordinates and the nearby seismic trace coordinates; and determine the seismic trace near well based on the Euclidean distance and perform first data processing on the seismic trace near well.

The second determination module 120 may be configured to perform, based on a target calibration object, second data processing on the logging information to determine a reflection coefficient sequence.

The second determination module 120 may also be configured to preprocess sonic time difference logging information, replace an anomalous segment of the sonic time difference logging information, and obtain preprocessed sonic time difference logging information; reconstruct density logging information, replace an anomalous value of the density logging information, and obtain reconstructed density logging information; smooth the preprocessed sonic time difference logging information to obtain smoothed sonic time difference logging information; determine a longitudinal wave velocity sequence based on the smoothed sonic time difference logging information; and determine a reflection coefficient sequence in a depth domain based on the longitudinal wave velocity sequence and the reconstructed density logging information.

The third determination module 130 may be configured to extract seismic wavelets of the seismic trace near well, convolute the seismic wavelets with the reflection coefficient sequence, determine a synthetic seismic record of the target calibration object in a time domain, and perform third data processing on the synthetic seismic record.

The third determination module 130 may also be configured to convert a reflection coefficient sequence in a depth domain to a reflection coefficient sequence in the time domain based on the sonic time difference logging information; determine, through a convolution model and error energy, a seismic wavelet with minimum error energy based on the reflection coefficient sequence in the time domain and a seismic trace near well record; and perform a convolution calculation based on the seismic wavelet and the reflection coefficient sequence in the time domain to determine the synthetic seismic record, and perform the third data processing on the synthetic seismic record.

The preliminary alignment module 140 may be configured to determine, through a first preset algorithm, a correlation between the seismic trace near well and the synthetic seismic record, determine a global time shift between the synthetic seismic record and the seismic trace near well, and perform a preliminary alignment on the synthetic seismic record through the global time shift.

The preliminary alignment module 140 may also be configured to determine a sampling plan for the seismic trace near well and the synthetic seismic record and determine a time window for each sampling point in the sampling plan; truncate the synthetic seismic record and the seismic trace near well based on the time window to generate a truncated synthetic seismic record and a truncated seismic trace near well, respectively; convert a geological stratification in a depth domain into a geological stratification in the time domain and calculate an amount of time deviation between the geological stratification in the time domain and a seismic horizon; determine at least one correlation between the truncated synthetic seismic record and the truncated seismic trace near well under at least one time shift, wherein a range of values for the at least one time shift is determined based on the amount of time deviation; obtain a time shift corresponding to a maximum correlation in the at least one correlation as the global time shift based on the correlation; and perform the preliminary alignment on the synthetic seismic record through the global time shift and determine a preliminarily aligned synthetic seismic record.

The preliminary alignment module 140 may be further configured to generate at least one candidate sampling plan, the at least one candidate sampling plan including a sampling feature for sampling each of at least one time domain subinterval; determine, based on each of the at least one candidate sampling plan, a seismic trace near well, a seismic wavelet, and a reflection coefficient sequence corresponding to the candidate sampling plan; determine the global time shift based on the seismic trace near well, the seismic wavelet, and the reflection coefficient sequence corresponding to the candidate sampling plan; filter the at least one candidate sampling plan set, obtain a first sampling plan set, and generate a first histogram distribution of global time shifts based on the global time shifts corresponding to candidate sampling plans in the first sampling plan set; and determine, based on the first sampling plan set and the first histogram distribution, a candidate sampling plan whose total downsampling rate exceeds a preset threshold and global time shift is the same as a global time shift with a highest frequency in the first histogram distribution in the first sampling plan set as the sampling plan.

The accurate calibration module 150 may be configured to calculate a local time shift between the seismic trace near well and the synthetic seismic record through a second preset algorithm and accurately calibrate the synthetic seismic record through the local time shift.

The accurate calibration module 150 may also be configured to construct an energy error matrix based on a preliminarily aligned synthetic seismic record and the seismic trace near well; calculate the energy error matrix through the second preset algorithm to construct a cumulative energy error matrix; calculate the cumulative energy error matrix through a route scan algorithm to determine an optimal route; and determine an accurately calibrated synthetic seismic record by accurately calibrating the synthetic seismic record based on the local time shift sequence.

For detailed explanation on the seismic data, the logging information, the seismic trace near well, the well coordinates, the nearby seismic trace coordinates, the reflection coefficient sequence, the longitudinal wave velocity sequence, the seismic wavelet, the synthetic seismic record, the first data processing, the second data processing, the third data processing, the convolution model, the error energy, the correlation, the global time shift, the sampling plan, the time window, the sampling feature, the first sampling plan set, the first histogram distribution, the candidate sampling plan, the local time shift, and the optimal route, please refer to FIGS. 2-5 and related descriptions thereof.

It should be noted that the above description of the system 100 for an accurate well-seismic tie based on stepwise matching and optimization is for descriptive convenience only and does not limit the present disclosure to the exemplified embodiments. It should be understood that for those skilled in the art, after understanding the principle of the system 100, it is possible to combine various modules arbitrarily or form a sub-system to connect with other modules without departing from the principles.

FIG. 2 is an exemplary flowchart of a method for an accurate well-seismic tie based on stepwise matching and optimization according to some embodiments of the present disclosure. In some embodiments, a process 200 may be implemented by a processor. As shown in FIG. 2, the process 200 may include the following steps.

Step 210, based on seismic data and logging information, determining target seismic data as aseismic trace near well and performing first data processing on the target seismic data.

The seismic data refers to relevant data obtained when conducting seismic exploration. In some embodiments, the seismic data may include seismic data in a time domain, a seismic interpretation horizon, etc. The seismic data in the time domain refers to seismic data studied from the time domain, such as seismic data recorded at different times for a same exploration site. The seismic interpretation horizon refers to information related to a seismic horizon transformed from seismic information obtained through the seismic exploration.

The logging information refers to logging information detected by logging techniques. In some embodiments, the logging information may include at least one of sonic time difference logging information, density logging information, resistivity logging information, well coordinates, and a geological stratification.

The sonic time difference logging information refers to logging information detected by sonic logging techniques, for example, a sonic logging curve, etc. In some embodiments, the sonic time difference logging information may include sonic time difference logging information, and the sonic time difference logging information refers to logging information detected by a sonic velocity logging technique.

The density logging information refers to logging information detected by density logging techniques. The resistivity logging information refers to logging information detected by resistivity logging techniques.

The well coordinates refer to coordinates of a well where oil and gas exploration are conducted. The geological stratification refers to different stratigraphic horizons divided by geology.

In some embodiments, the processor may obtain the seismic data and the logging information in a variety of ways. For example, the processor may obtain the seismic data and the logging information through a user input. As another example, the processor may obtain the seismic data and the logging information stored in a exploration device via a network. The exploration device refers to a device used by users for seismic exploration, logging, etc.

The target seismic data refers to seismic data that needs to be analyzed. For example, the target seismic data may be seismic data within a preset range threshold from the well coordinates.

The seismic trace near well refers to a seismic trace near the well.

In some embodiments, the processor may determine seismic data closest to the well coordinates as the target seismic data and the seismic trace near well.

In some embodiments, the processor may calculate a Euclidean distance between the well coordinates and nearby seismic trace coordinates based on the well coordinates and the nearby seismic trace coordinates, determine the seismic trace near well based on the Euclidean distance, and perform the first data processing on the seismic trace near well.

The nearby seismic trace refers to a seismic trace near the well, for example, a seismic trace within a preset range threshold from the well coordinates. The nearby seismic trace coordinates refer to geographical coordinates corresponding to the nearby seismic trace. The processor may obtain the nearby seismic trace coordinates by obtaining relevant information stored in the exploration device via the network.

In some embodiments, the processor may calculate the Euclidean distance between the well coordinates and the nearby seismic trace coordinates based on the well coordinates and the nearby seismic trace coordinates using a Euclidean distance formula, a math.dist( ) function, etc.

In some embodiments, the processor may calculate Euclidean distances between the well coordinates and different nearby seismic trace coordinates, rank the Euclidean distances from shortest to longest, designate a nearby seismic trace with a shortest Euclidean distance as the seismic trace near well, note the shortest Euclidean distance as seis(t), perform the first data processing on the seismic trace near well, and note the processed seismic trace near well as Seis(t).

By calculating the Euclidean distance based on the well coordinates and the nearby seismic trace coordinates to determine the seismic trace near well and performing the first data processing on the seismic trace near well as described in some embodiments of the present disclosure, it is conducive to obtaining the distances between the well coordinates and the different seismic traces with high accuracy, which helps to accurately determine the seismic data closest to the well coordinates as the seismic trace near well.

The first data processing refers to data processing performed on the target seismic data (i.e., the seismic trace near well). For example, the first data processing may be normalization processing performed on the target seismic data, etc.

In some embodiments, the processor may perform the first data processing on the target seismic data in a variety of ways. For example, the processor may normalize the target seismic data by min-max normalization, z-score standardization, etc.

Step 220, performing, based on a target calibration object, second data processing on the logging information to determine a reflection coefficient sequence.

The target calibration object refers to a well that needs to be calibrated.

In some embodiments, the processor may obtain the target calibration object in a variety of ways. For example, the target calibration object may be obtained by obtaining the user input.

The second data processing refers to data processing performed on the logging information. For example, the second data processing may be preprocessing performed on the logging information, etc.

In some embodiments, the processor may perform the second data processing on the logging information in a variety of ways. For example, the processor may perform a depth correction on the logging information using a depth control curve and perform noise removal on the logging information using a smooth filtering technique.

The reflection coefficient sequence refers to a sequence composed of stratigraphic reflection coefficients.

In some embodiments, the processor may generate a sonic logging curve and a density logging information curve through the sonic time difference logging information and the density logging information, and obtain the reflection coefficient sequence by calculating the sonic logging curve and density logging information curve.

In some embodiments, the processor may determine a reflection coefficient sequence in a depth domain based on the longitudinal wave velocity sequence and reconstructed density logging information. See FIG. 3 for a detailed description of determining the reflection coefficient sequence.

Figure 6A:
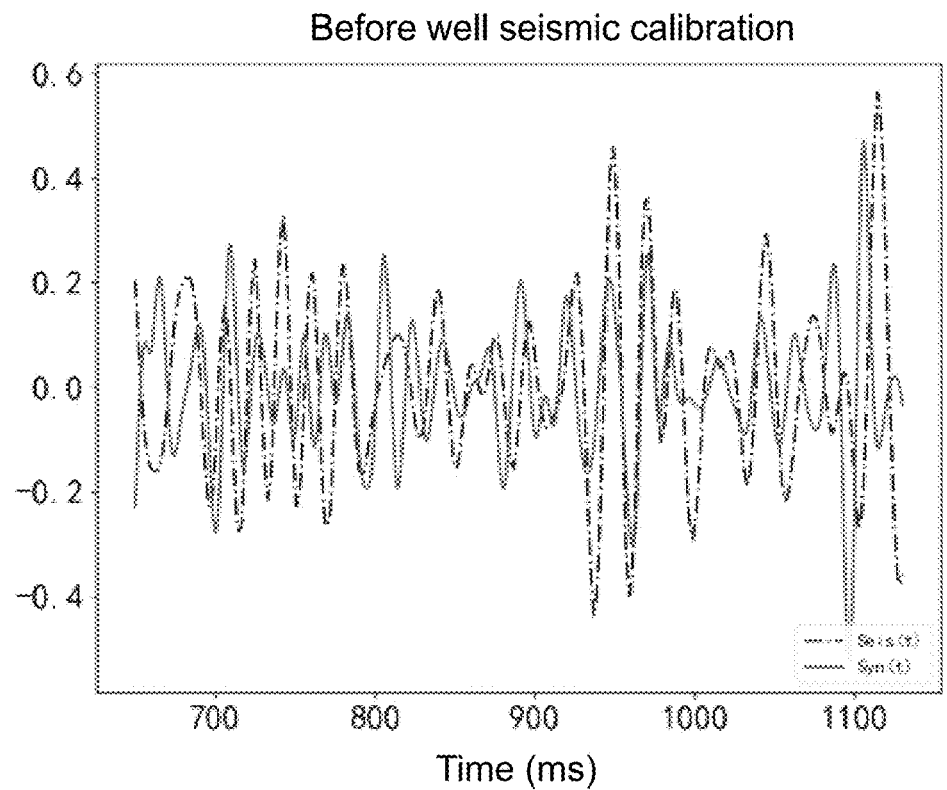
FIG. 6A is a schematic diagram of a comparison between a synthetic seismic record to be calibrated and a seismic trace near well according to some embodiments of the present disclosure.

Step 230, extracting seismic wavelets of the seismic trace near well, convoluting the seismic wavelets with the reflection coefficient sequence, determining a synthetic seismic record of the target calibration object in a time domain, and performing third data processing on the synthetic seismic record. An exemplary comparison between the synthetic seismic record to be calibrated and the seismic trace near well is shown in FIG. 6A, where the dashed line is the seismic trace near well and the solid line is the synthetic seismic record to be calibrated.

In some embodiments, the processor may extract the seismic wavelets of the seismic trace near well in a variety of ways. For example, the processor may extract the seismic wavelets of the seismic trace near well through a deterministic sub-wave extraction technique, a statistical sub-wave extraction technique, etc.

In some embodiments, the processor may perform a convolution calculation based on the seismic wavelet and the reflection coefficient sequence in the time domain to determine the synthetic seismic record. See FIG. 3 for a detailed description.

The third data processing refers to data processing performed on the synthetic seismic record. For example, the third data processing may be normalization processing performed on the synthetic seismic record, etc.

A specific process for performing the third data processing on the synthetic seismic record may be found in a process for performing the first data processing on the target seismic data, which is not repeated here.

Step 240, determining, through a first preset algorithm, a correlation between the seismic trace near well and the synthetic seismic record, determining a global time shift between the synthetic seismic record and the seismic trace near well, and performing a preliminary alignment on the synthetic seismic record through the global time shift.

The first preset algorithm refers to a preset algorithm for determining a correlation between the seismic trace near well and the synthetic seismic record. In some embodiments, the first preset algorithm refers to a high-accuracy mutual correlation scan algorithm. The first preset algorithm may be set empirically.

The correlation refers to a parameter that characterizes a strength of relevance between the seismic trace near well and the synthetic seismic record. The larger the correlation, the stronger the relevance between the seismic trace near well and the synthetic seismic record.

Figure 7:
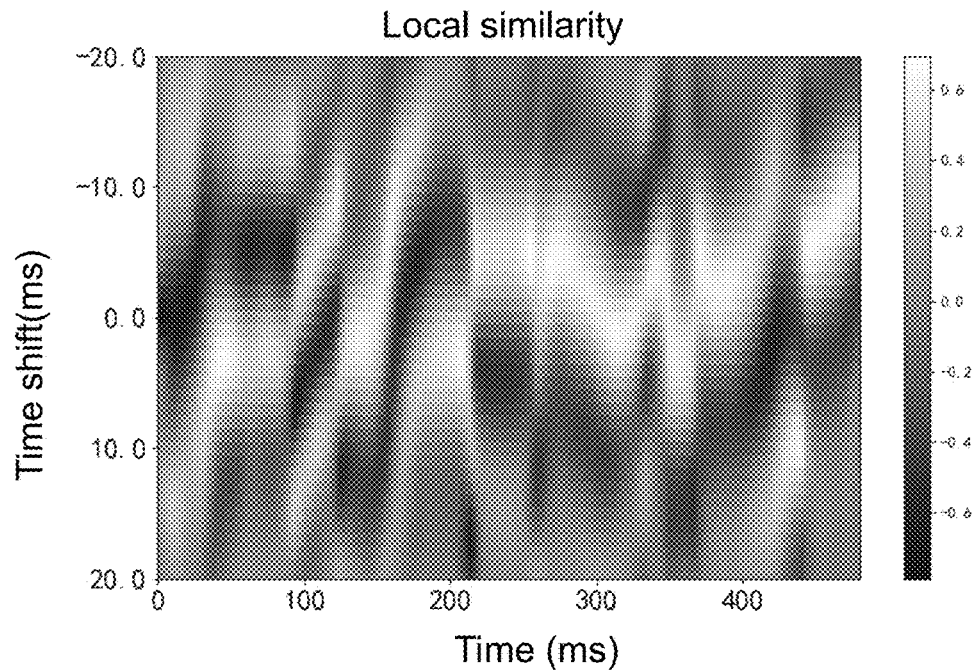
FIG. 7 is a schematic diagram of a correlation between a seismic trace near well and a synthetic seismic record calculated using a high-accuracy mutual correlation scan algorithm according to some embodiments of the present disclosure.

In some embodiments, the processor may determine the correlation between the seismic trace near well and the synthetic seismic record through the first preset algorithm. An exemplary correlation between the seismic trace near well and the synthetic seismic record calculated using the high-accuracy mutual correlation scan algorithm is shown in FIG. 7.

A time shift refers to a time offset in data. The global time shift refers to a global time shift between the synthetic seismic record and the seismic trace near well.

In some embodiments, the processor may determine the global time shift in a variety of ways. For example, the processor may obtain the user input to determine the global time shift. As another example, the processor may determine correlations of different time shifts based on the first preset algorithm and designate a time shift whose correlation meets a preset correlation condition as the global time shift. The preset correlation condition may be set empirically.

The preliminary alignment refers to an initial, rougher alignment.

Figure 6B:
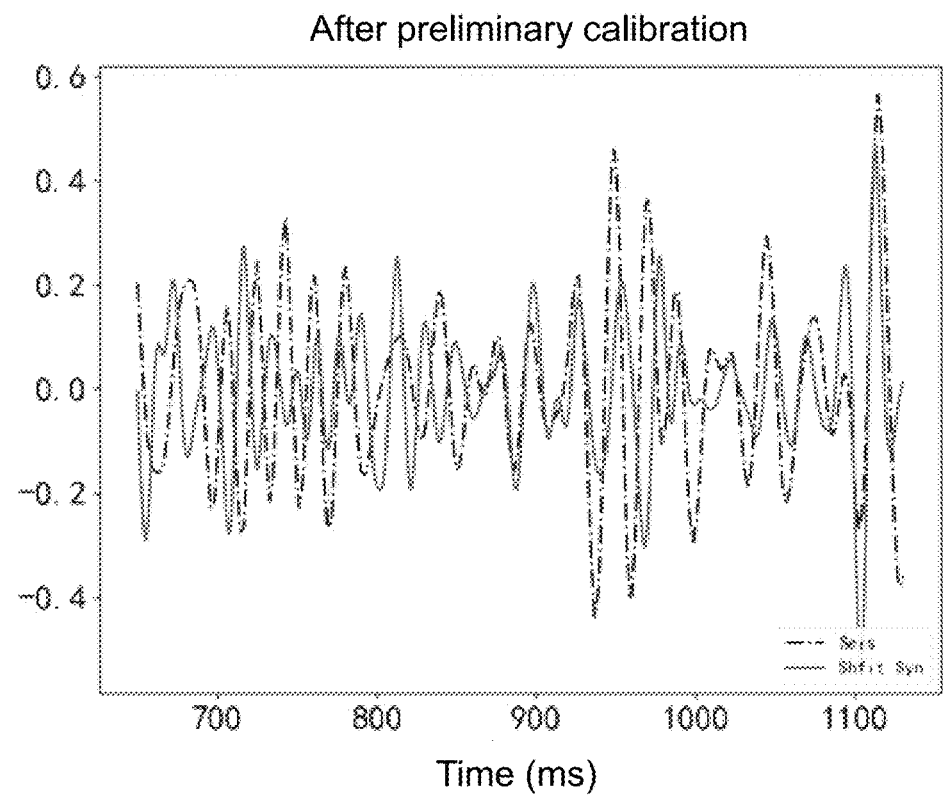
FIG. 6B is a schematic diagram of a comparison between a synthetic seismic record after a preliminary alignment using a global time shift and the seismic trace near well according to some embodiments of the present disclosure.

In some embodiments, the processor may perform the preliminary alignment on the synthetic seismic record by global time-shifting the synthetic seismic record in the time domain based on the global time shift. An exemplary comparison between a synthetic seismic record after the preliminary alignment using the global time shift and the seismic trace near well is shown in FIG. 6B, where the dashed line is the seismic trace near well and the solid line is the synthetic seismic record.

In some embodiments, the processor may determine at least one correlation between the truncated synthetic seismic record and the truncated seismic trace near well under at least one time shift, obtain a time shift corresponding to a maximum correlation in the at least one correlation as the global time shift, and perform the preliminary alignment on the synthetic seismic record. See FIG. 4 for a detailed description.

Step 250, calculating a local time shift between the seismic trace near well and the synthetic seismic record through a second preset algorithm and accurately calibrating the synthetic seismic record through the local time shift.

The second preset algorithm refers to a preset algorithm for determining the local time shift between the seismic trace near well and the synthetic seismic record. In some embodiments, the second preset algorithm refers to a dynamic time regularization algorithm that utilizes route constraints. The second preset algorithm may be set empirically.

The local time shift refers to a local time shift between the synthetic seismic record and the seismic trace near well.

In some embodiments, the processor may calculate and determine the local time shift between the seismic trace near well and the synthetic seismic record through the second preset algorithm.

The accurate calibration refers to a more accurate alignment than the preliminary alignment.

Figure 6C:
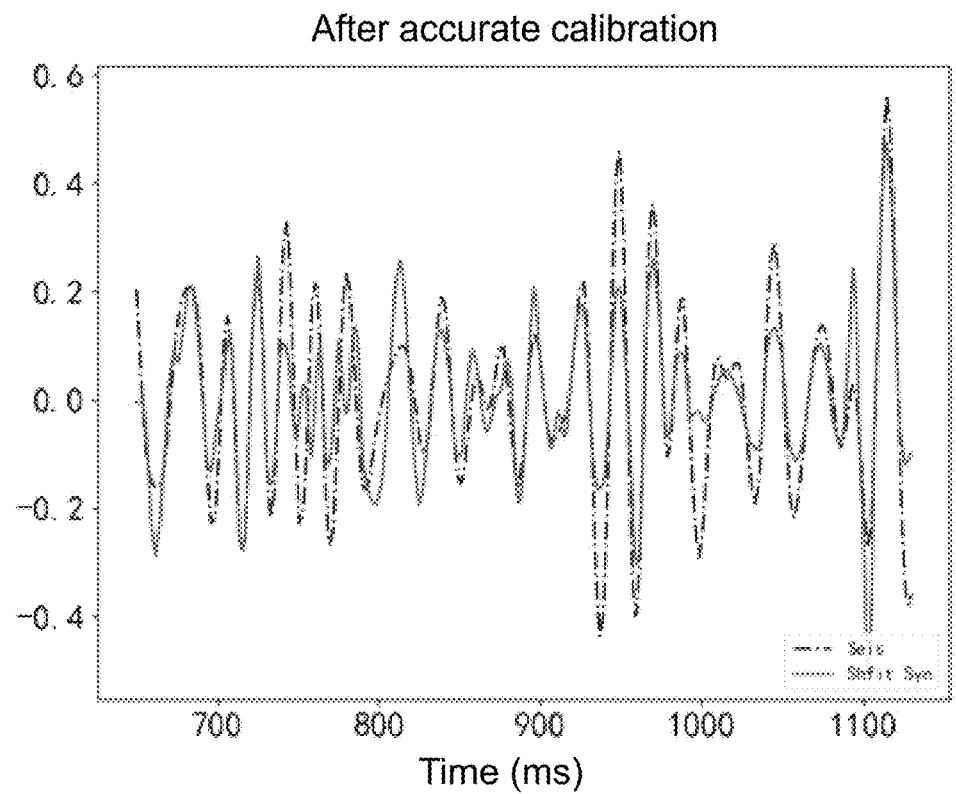
FIG. 6C is a schematic diagram of a comparison between a preliminary aligned synthetic seismic record after an accurate calibration using a local time shift and the seismic trace near well according to some embodiments of the present disclosure.

In some embodiments, the processor may time shift a local synthetic seismic record in the time domain based on the local time shift for accurate calibration. An exemplary comparison between a preliminary aligned synthetic seismic record after an accurate calibration using a local time shift and the seismic trace near well is shown in FIG. 6C, where the dashed line is the seismic trace near well and the solid line is the synthetic seismic record.

In some embodiments, the processor may determine the accurately calibrated synthetic seismic record based on a local time shift sequence. See FIG. 5 for a detailed description.

According to some embodiments of the present disclosure, by determining the seismic trace near well based on the seismic data and the logging information; determining the reflection coefficient sequence based on the target calibration object and the logging information; extracting the seismic wavelets of the seismic trace near well, convoluting the seismic wavelets with the reflection coefficient sequence, determining the synthetic seismic record, determining the global time shift through the first preset algorithm, and performing the preliminary alignment; and calculating the local time shift through the second preset algorithm for the accurate calibration, an intelligent and efficient well-seismic tie can be realized, improving accuracy and stability of the calibration, effectively enhancing calibration efficiency while ensuring calibration accuracy, and avoiding inefficiency of manual calibration and errors of automatic calibration.

Figure 3:
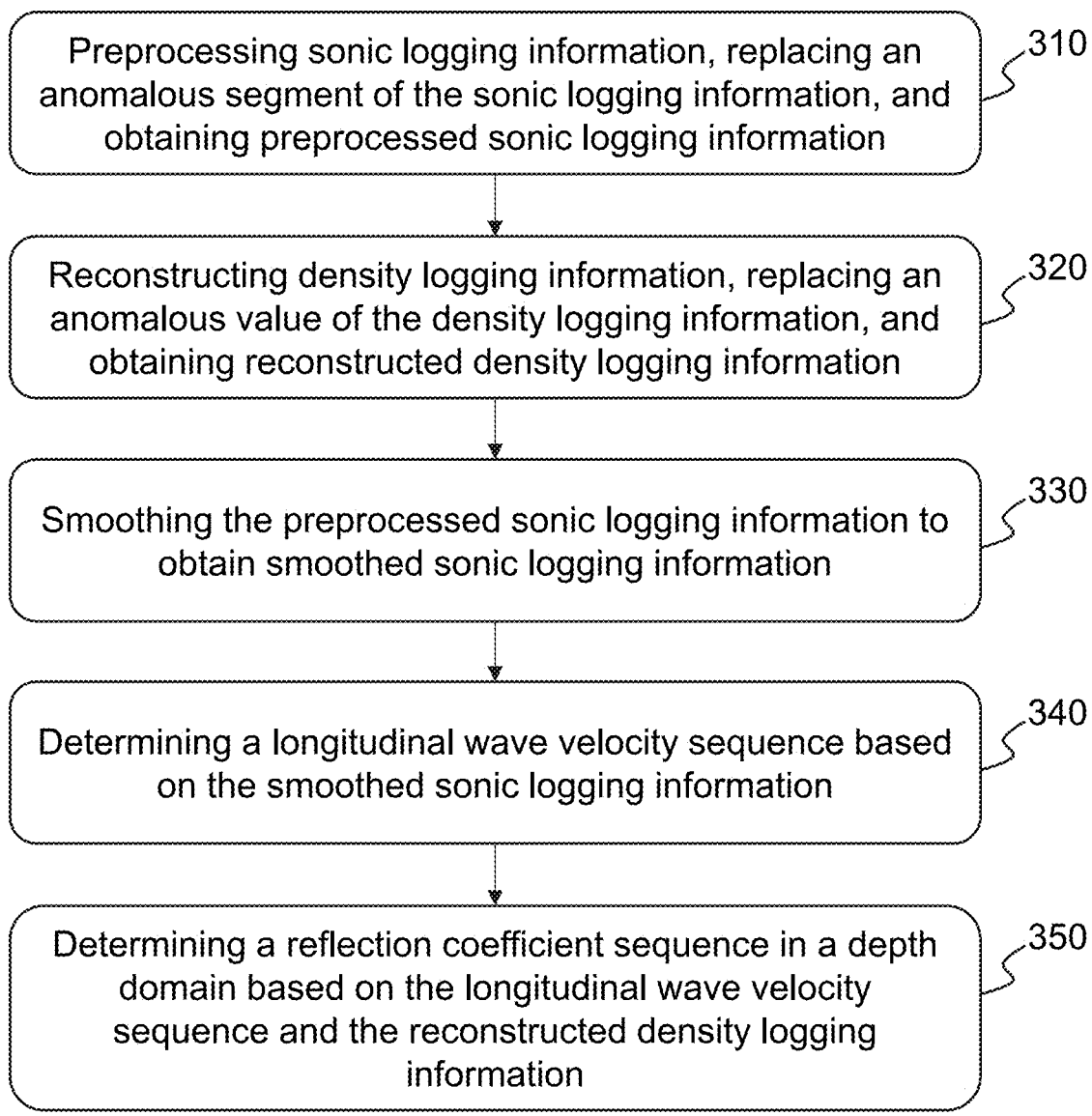
FIG. 3 is an exemplary flowchart of determining a reflection coefficient sequence according to some embodiments of the present disclosure.

FIG. 3 is an exemplary flowchart of determining a reflection coefficient sequence according to some embodiments of the present disclosure. In some embodiments, a process 300 may be implemented by a processor. As shown in FIG. 3, the process 300 includes the following steps.

Step 310, preprocessing sonic time difference logging information, replacing an anomalous segment of the sonic time difference logging information, and obtaining preprocessed sonic time difference logging information.

The anomalous segment refers to an anomalous curve segment in the sonic time difference logging information. For example, the anomalous segment may be a curve segment in the sonic time difference logging information that differs significantly from surrounding curves due to well diameter variations, stratigraphic fragmentation, etc.

In some embodiments, the processor may divide the sonic time difference logging information into a plurality of sonic time difference logging sub-segments, calculate an average sonic time difference logging value for data in each sonic time difference logging sub-segment separately, and compare the average sonic time difference logging value with the data in the sonic time difference logging sub-segments. If there is a ratio of the sonic time difference logging sub-segment to the average sonic time difference logging value that exceeds a preset multiplier threshold, a curve segment corresponding to the data is determined as an anomalous segment of the sonic time difference logging information. The preset multiplier threshold may be set empirically.

Understandably, the sonic time difference logging information may be affected by measurement environments, measurement errors, and other factors that may result in data anomalous segment(s), and preprocessing is required to ensure accuracy of the sonic time difference logging information.

In some embodiments, the processor may preprocess the sonic time difference logging information based on a formula (1), replace the anomalous segment of the sonic time difference logging information, and obtain the preprocessed sonic time difference logging information:

$$\widetilde{DT}(d) = (R(d) \times d)^m \times DT(d), \qquad (1)$$

wherein DT(d) denotes the sonic time difference logging information before preprocessing, R(d) denotes the resistivity logging information, $\widetilde{DT}(d)$ denotes sonic time difference logging information after the preprocessing, d denotes a logging depth value, and m denotes a constant.

Step 320, reconstructing density logging information, replacing an anomalous value of the density logging information, and obtaining reconstructed density logging information.

The anomalous value refers to an anomalous value in the density logging information. For example, the anomalous value may be a value in the density logging information that differs significantly from surrounding values due to well diameter variations, stratigraphic fragmentation, etc.

In some embodiments, the processor may divide the density logging information into a plurality of density logging sub-segments, calculate an average density logging value for data in each density logging sub-segment separately, set an average value threshold based on the average density logging value, and determine data in the density logging sub-segments that exceed the average value threshold as the anomalous value. A specific process for setting the average value threshold based on the average density logging value may be set empirically.

Understandably, the density logging information may be subject to data anomalous value due to well diameter variations, measurement errors, and other factors, and the preprocessing is required to ensure the accuracy of the density logging information. The well diameter variations refer to a change in the well diameter caused by the collapse of the well wall.

In some embodiments, the processor may reconstruct the density logging information based on a Gardner formula to replace the anomalous value of the density logging information and obtain the reconstructed density logging information by:

$$\tilde{p}(d) = 0.31 \times \left(\frac{10000}{\tilde{DT}(d)}\right)^{0.25}, \tag{2}$$

wherein $\tilde{p}(d)$ denotes a reconstructed density logging curve.

Step 330, smoothing the preprocessed sonic time difference logging information to obtain smoothed sonic time difference logging information.

Smoothing refers to a process of filtering out noise from data with minimal modification of original data.

In some embodiments, the processor may use a sliding-mean digital filtering technique to smooth the preprocessed sonic time difference logging information and obtain the smoothed sonic time difference logging information, which is calculated by a formula (3) as:

$$\dot{DT}(d) = \frac{1}{(2n+1)} \sum_{i=-n}^{n} \tilde{DT}(d+n), \tag{3}$$

wherein $\dot{DT}(d)$ denotes the smoothed acoustic logging information, n denotes a count of points involved in the filtering, and n is a constant.

Step 340, determining a longitudinal wave velocity sequence based on the smoothed sonic time difference logging information.

The longitudinal wave velocity sequence refers to a sequence composed of longitudinal wave velocities.

In some embodiments, the processor may determine the longitudinal wave velocity sequence based on the sonic time difference logging information by a formula (4):

$$Vp(d) = \frac{100000}{\dot{DT}(d)}, \tag{4}$$

wherein Vp(d) denotes the longitudinal wave velocity, and the processor may form the longitudinal wave velocity sequence by combining longitudinal wave velocities calculated based on sonic time difference logging information at different time points.

Step 350, determining a reflection coefficient sequence in a depth domain based on the longitudinal wave velocity sequence and the reconstructed density logging information.

The reflection coefficient sequence in the depth domain refers to a reflection coefficient sequence expressed in space, such as a reflection coefficient sequence of exploration points at different depths within a same time.

In some embodiments, the processor may calculate the reflection coefficient sequence in the depth domain Ref (d) based on the longitudinal wave velocity sequence and the reconstructed density logging information using reflection coefficient formula(s).

In some embodiments, the processor may convert the reflection coefficient sequence in the depth domain to the reflection coefficient sequence in the time domain based on the sonic time difference logging information; determine, through a convolution model and error energy, a seismic wavelet with minimum error energy based on the reflection coefficient sequence in the time domain and a seismic trace near well record; and perform a convolution calculation based on the seismic wavelet and the reflection coefficient sequence in the time domain to determine the synthetic seismic record, and perform third data processing on the synthetic seismic record.

The reflection coefficient sequence in the time domain refers to a reflection coefficient sequence expressed in time, such as a reflection coefficient sequence of an exploration point with a same depth at different times.

In some embodiments, the processor may, based on the sonic time difference logging information, calculate a correspondence between the depth domain and the time domain to convert the reflection coefficient sequence in the depth domain to the reflection coefficient sequence in the time domain through a formula (15):

$$T_b = 2 \int_{Z_a}^{Z_b} 10^{-3} \times \Delta t(Z) dz, \tag{15}$$

wherein $Z_a$ denotes an initial depth of the sonic time difference logging information, $Z_b$ denotes a terminal depth of the sonic time difference logging information, $T_b$ denotes a corresponding time, and $\Delta t(Z)$ denotes a sonic time difference value corresponding to the depth Z.

The seismic trace near well record refers to a specific data record of the seismic trace near well. The processor may obtain the seismic trace near well record stored in an exploration device via a network.

The error energy refers to a parameter that characterizes a difference in energy between sampling points. For example, the error energy may be a squared value of a difference between amplitudes of two sampling points. In some embodiments, the processor may take a point from the seismic trace near well record and a point from the synthetic seismic record and calculate a square of a difference between the amplitudes of the two points as the error energy of the two points.

In some embodiments, the processor may calculate the seismic wavelet through the convolution model based on the reflection coefficient sequence and the seismic trace near well record, and calculate a seismic wavelet with minimum error energy based on a least square principle using a formula (5).

$$\varepsilon = \sum_{t=0}^{M} (\omega(t) * Ref(t) - seis(t))^2, \tag{5}$$

wherein ε denotes the error energy, w(t) denotes the seismic wavelet calculated through the convolution model, Ref(t) denotes the reflection coefficient sequence in the time domain, M denotes a total count of sampling points, * denotes the convolution calculation, and seis(t) denotes the seismic trace near well before the first data processing. More on the total count of sampling points may be found in FIG. 4 and related descriptions thereof.

In some embodiments, the processor may perform the convolution calculation to determine the synthetic seismic record based on the seismic wavelet with minimum the error energy and the reflection coefficient sequence in the time domain using a formula (6):

$$Syn(t) = Ref(t) * \omega(t), \quad (6)$$

wherein Syn(t) denotes the synthetic seismic record.

In some embodiments, the processor may perform the third data processing on the synthetic seismic record. More about the third data processing may be found in FIG. 2 and related descriptions thereof.

According to some embodiments of the present disclosure, by obtaining the reflection coefficient sequence in the time domain, determining the seismic wavelet with the minimum error energy through the convolution model and the error energy, performing the convolution calculation, determining the synthetic seismic record, and performing the third data processing on the synthetic seismic record, an accurate and reasonable synthetic seismic record can be obtained for subsequent calibration of the seismic trace near well.

According to some embodiments of the present disclosure, by obtaining the preprocessed sonic time difference logging information, the reconstructed density logging information, and the smoothed sonic time difference logging information, determining the longitudinal wave velocity sequence, and then determining the reflection coefficient sequence in the depth domain, obtained data can be processed to eliminate data errors caused by environmental factors, manual operations, etc., as much as possible, remove an influence of noisy data, and obtain the reflection coefficient sequence in the depth domain with high accuracy.

Figure 4:
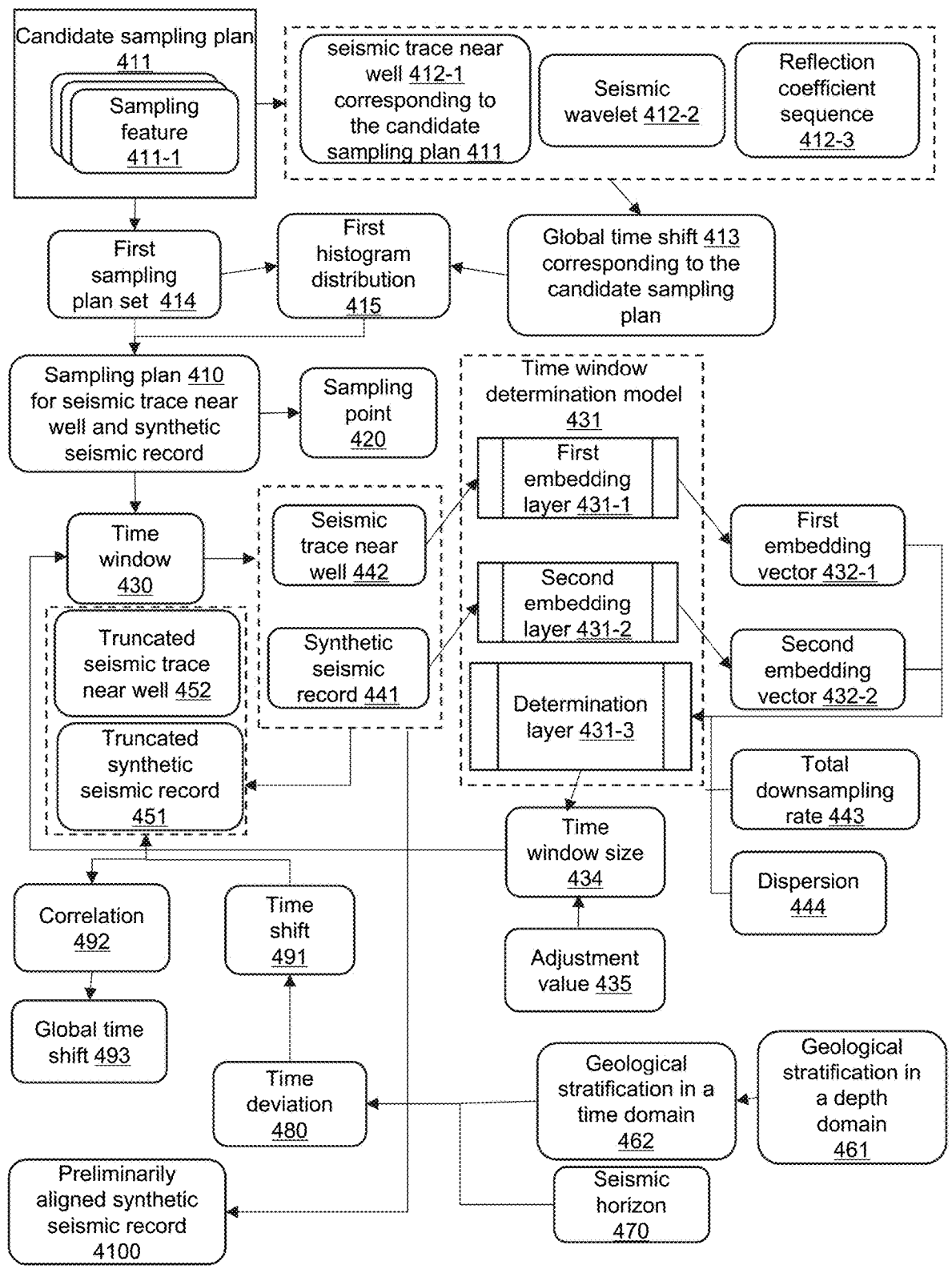
FIG. 4 is a schematic diagram of performing a preliminary alignment on a synthetic seismic record according to some embodiments of the present disclosure.

FIG. 4 is a schematic diagram of performing a preliminary alignment on a synthetic seismic record according to some embodiments of the present disclosure.

In some embodiments, a processor may determine a sampling plan 410 for a seismic trace near well 442 and a synthetic seismic record 441, determine a time window 430 for each sample point 420 in the sampling plan 410; truncate the synthetic seismic record 441 and the seismic trace near well 442 based on the time window 430 to generate a truncated synthetic seismic record 451 and a truncated seismic trace near well 452, respectively; convert a geological stratification 461 in a depth domain to a geological stratification 462 in a time domain and calculate an amount of time deviation 480 between the geological stratification 462 in the time domain and a seismic horizon 470; determine at least one correlation 492 between the truncated synthetic seismic record 451 and the truncated seismic trace near well 452 under at least one time shift 491, a range of values for the at least one time shift 491 being determined based on the amount of time deviation 480; obtain a time shift corresponding to a maximum correlation in the at least one correlation as the global time shift based on the correlation 492 as a global time shift 493; perform a preliminary alignment on the synthetic seismic record 441 through the global time shift 493 and determine a preliminarily aligned synthetic seismic record 4100.

The sampling plan 410 refers to a specific plan for sampling data. In some embodiments, the sampling plan 410 may include a count of sampling points and a sampling feature 411-1 for sampling each of at least one time domain subinterval. A sampling point 420 refers to a data point for sampling. The time domain subinterval refers to a partial interval of the time domain. In some embodiments, different time domain subintervals may have different counts of sampling points. The sampling feature 411-1 refers to sampling-related data information. In some embodiments, the sampling feature 411-1 may be a downsampling rate, and the downsampling rate refers to a ratio of a count of data points obtained after downsampling in a certain time domain to a count of original data points in the time domain.

In some embodiments, the processor may determine the sampling plan 410 for the seismic trace near well 442 and the synthetic seismic record 441 in a variety of ways. For example, the processor may determine the sampling plan 410 by obtaining a user input.

In some embodiments, the processor may generate at least one candidate sampling plan 411, the at least one candidate sampling plan 411 including a sampling feature 411-1 for sampling each of at least one time domain subinterval; determine, based on each of the at least one candidate sampling plan 411, a seismic trace near well 412-1, a seismic wavelet 412-2, and a reflection coefficient sequence 412-3 corresponding to the candidate sampling plan 411; determine the global time shift 413 corresponding to the candidate sampling plan 411 based on the seismic trace near well 412-1, the seismic wavelet 412-2, and the reflection coefficient sequence 412-3 corresponding to the candidate sampling plan 411; filter the at least one candidate sampling plan 411, obtain a first sampling plan set 414, and generate a first histogram distribution 415 of the global time shift 413 based on the global time shift 413 corresponding to candidate sampling plan 411 in the first sampling plan set 414; and determine, based on the first sampling plan set 414 and the first histogram distribution 415, a candidate sampling plan whose total downsampling rate exceeds a preset threshold and global time shift is the same as a global time shift with a highest frequency in the first histogram distribution 415 in the first sampling plan set 414 as the sampling plan.

The candidate sampling plan 411 refers to a sampling plan that may be selected.

In some embodiments, the processor may generate the at least one candidate sampling plan 411 in a variety of ways. For example, the processor may randomly generate the at least one candidate sampling plan 411. As another example, the processor may divide the time domain of the seismic trace near well 442 and the synthetic seismic record 441 into a plurality of time domain subintervals based on a preset interval threshold, each time domain subinterval using the same sampling feature 411-1. A specific value of the sampling feature 411-1 may be preset based on experience.

In some embodiments, the processor may divide the time domain of the seismic trace near well 442 and the synthetic seismic record 441 into the plurality of time domain subintervals based on the preset interval threshold, each time domain subinterval using a different kind of sampling feature 411-1. For example, the processor may divide the time domain of the seismic trace near well 442 into five time domain subintervals, and then the sampling feature of subinterval 1 is downsampling rate 1, . . . , and the sampling feature of subinterval 5 is downsampling rate 5.

In some embodiments, the processor may re-perform data point sampling on the seismic trace near well 442 based on the candidate sampling plan 411 to determine the seismic trace near well 412-1 corresponding to the candidate sampling plan 411.

In some embodiments, the processor may re-perform data point sampling on the logging information based on the candidate sampling plan 411, determine the logging information corresponding to the candidate sampling plan 411, and then determine the reflection coefficient sequence 412-3 corresponding to the candidate sampling plan 411, details of which may be found in a process for determining the reflection coefficient sequence in FIG. 3.

In some embodiments, the processor may determine the seismic wavelet 412-2 corresponding to the candidate sampling plan 411 based on the seismic trace near well 412-1 corresponding to the candidate sampling plan 411 and the reflection coefficient sequence 412-3 corresponding to the candidate sampling plan 411, details of which may be found in a way for determining the seismic wavelet in FIG. 3.

In some embodiments, the processor may determine the global time shift 413 corresponding to the candidate sampling plan 411 based on the seismic trace near well 412-1, the seismic wavelet 412-2, and the reflection coefficient sequence 412-3 corresponding to the candidate sampling plan 411. A specific process may be seen later in a process for determining the global time shift based on the correlation 492 between the truncated synthetic seismic record 451 and the truncated seismic trace near well 452.

The first sampling plan set 414 refers to a set composed of filtered candidate sampling plans 411.

In some embodiments, the processor may filter the at least one candidate sampling plan 411 through a preset rule to obtain the first sampling plan set 414.

In some embodiments, the preset rule may be to add a sampling plan where the total downsampling rate is less than a first threshold and a dispersion of an interval downsampling rate is greater than a second threshold to the first sampling plan set 414. The first threshold and the second threshold may be set based on experience.

The total downsampling rate refers to a ratio of a count of data points obtained after downsampling over the entire time domain in the candidate sampling plan 411 to a total count of data points in the original data.

The interval downsampling rate refers to a ratio of a count of data points obtained after downsampling in a time domain interval in the candidate sampling plan 411 to a total count of the data points in original data in the time domain interval. The dispersion of the interval downsampling rate refers to a parameter that reflects a data distribution concentration of the interval downsampling rate. A larger dispersion indicates a more dispersed data distribution of the interval downsampling rate. The processor may calculate a variance based on a plurality of interval downsampling rates; and the larger the variance, the greater the dispersion.

In some embodiments, the processor may directly calculate the total downsampling rate and the dispersion of the interval downsampling rate based on a count of sampling points of the candidate sampling plan 411 and the count of the data points in the original data.

Understandably, the total downsampling rate is less than the first threshold, indicating that accuracy of the corresponding candidate sampling plan 411 is similar to that of the original data and is considered to reflect features of the original data. The dispersion of the interval downsampling rate is greater than the second threshold, indicating that the corresponding candidate sampling plan 411 is more focused on downsampling one or more time domain intervals rather than a whole, and has less impact on global features possessed by the original data.

The first histogram distribution 415 refers to a frequency histogram distribution of the global time shift 413 corresponding to the candidate sampling plan 411 in the first sampling plan set 414.

In some embodiments, the processor may generate the first histogram distribution 415 directly through a data analysis software etc., based on the obtained global time shift 413 corresponding to the candidate sampling plan 411 in the first sampling plan set 414.

In some embodiments, the processor may determine, based on the first sampling plan set 414 and the first histogram distribution, a candidate sampling plan 411 whose total downsampling rate exceeds a preset threshold and global time shift is the same as a global time shift with a highest frequency in the first histogram distribution in the first sampling plan set 414 as the sampling plan.

Understandably, selecting a sampling plan with larger downsampling rates can improve efficiency of subsequent data processing; and by choosing a sampling plan whose global time shift is the same as the global time shift with the highest frequency in the first histogram distribution 415, it is possible to select a sampling plan in which downsampling has less impact on the features reflected in the data.

According to some embodiments of the present disclosure, by generating at least one candidate sampling plan, determining the global time shift corresponding to the candidate sampling plan, obtaining the first sampling plan set and generating the first histogram distribution of the global time shifts, and then determining the sampling plan, the sampling plan that maintains the global features of the original data as much as possible and has the largest possible total downsampling rate can be efficiently obtained, optimizing subsequent computation and saving computational resources.

The time window 430 refers to a time interval corresponding to a time when the data is truncated.

In some embodiments, the processor may determine the time window 430 for each sample point 420 in the sampling plan 410 by selecting a preset time window size, which may be determined based on experience.

In some embodiments, the processor may determine a time window size 434 of the time window 430 based on the seismic trace near well 442 and the synthetic seismic record 441 using a time window determination model 431, which may be a machine learning model.

The time window size 434 refers to a value of a time interval corresponding to the time window 430.

The time window determination model 431 may be a model for determining the time window size 434. In some embodiments, the time window determination model 431 may be a machine learning model. For example, the time window determination model 431 may be a Deep Neural Network (DNN) model, a Recurrent Neural Network (RNN) model, or a combination of one or more other custom models, without restriction in the present disclosure.

In some embodiments, the time window determination model 431 may include a first embedding layer 431-1, a second embedding layer 431-2, and a determination layer 431-3.

In some embodiments, the first embedding layer 431-1, the second embedding layer 431-2, and the determination layer 431-3 may be a DNN model, an RNN model, etc.

The first embedding layer 431-1 may be configured to determine a first embedding vector 432-1. In some embodiments, an input of the first embedding layer 431-1 is the seismic trace near well 442, and an output is the first embedding vector 432-1. The first embedding vector 432-1 refers to vector information reflecting relevant features of data of the seismic trace near well.

The second embedding layer 431-2 may be configured to determine a second embedding vector 432-2. In some embodiments, an input of the second embedding layer 431-2 is the synthetic seismic record 441 and an output is the second embedding vector 432-2. The second embedding vector 432-2 refers to vector information reflecting the relevant features of data of the synthetic seismic record.

The determination layer 431-3 may be configured to determine the time window size 434. In some embodiments, an input of the determination layer 431-3 is the first embedding vector 432-1 and the second embedding vector 432-2, and the output is the time window size.

In some embodiments, the first embedding layer 431-1, the second embedding layer 431-2, and the determination layer 431-3 may be obtained by joint training. In some embodiments, training samples for the joint training include a sample seismic trace near well, a sample synthetic seismic record, a label is the time window size used to make calibration results of the sample seismic trace near well and the sample synthetic seismic record more accurate, and accuracy of the calibration results may be determined empirically. The training samples may be obtained based on historical data, and the label may be obtained based on manual labeling.

During the training, the sample seismic trace near well is input to the first embedding layer and the sample synthetic seismic record is input to the second embedding layer to obtain the first embedding vector output by the first embedding layer and the second embedding vector output by the second embedding layer, and the first embedding vector and the second embedding vector are input to the determination layer to obtain the time window size output by the determination layer.

A loss function is constructed based on the label and the time window size, and parameters of the first embedding layer, the second embedding layer, and the determination layer are updated simultaneously. The trained first embedding layer 431-1, the second embedding layer 431-2, and the determination layer 431-3 are obtained by updating parameters.

In some embodiments, the input of the determination layer 431-3 may also include a total downsampling rate 443 of the sampling plan for the sampling points corresponding to the time window 430 and a dispersion 444 of downsampling rates for a plurality of time domain subintervals.

In some embodiments, when performing the joint training, the processor may input a total sample downsampling rate and a sample dispersion as the training samples along with the first embedding vector and the second embedding vector into the determination layer.

By using the total downsampling rate and the dispersion also as an input of the determination layer as described in some embodiments of the present disclosure, it is possible to compensate for the effect of downsampling on the data features of the original data and obtain an accurate time window size.

In some embodiments of the present disclosure, by determining the first embedding vector through the first embedding layer, the second embedding vector through the second embedding layer, and the time window size through the determination layer, it is possible to obtain the data features of the seismic trace near well and the synthetic seismic record, and thus the time window is appropriate to an actual situation of the data.

In some embodiments, the time window size may also include an adjustment value 435. The adjustment value 435 refers to a value that adjusts the time window size 434 output by the time window determination model 431.

In some embodiments, the adjustment value 435 may be determined based on the interval downsampling rate of the time domain interval to which the sample points corresponding to the time window belong. The interval downsampling rate refers to a downsampling rate of a corresponding time domain interval, which may be obtained based on calculation. See previous sections for details on how to determine the downsampling rate.

When the interval downsampling rate is larger, the adjustment value 435 may be increased appropriately. A specific increase value may be preset based on experience.

In some embodiments, the processor may take the sum of the time window size 434 and the adjustment value 435 output by the time window determination model 431 as a final time window size.

The time window size described by some embodiments of the present disclosure also includes the adjustment value, which is determined based on the interval downsampling rate of the time domain interval to which the sampling points corresponding to the time window belong, and the time window may be adjusted based on the downsampling to compensate for a loss of data features caused by the downsampling.

By determining the time window size through the time window determination model based on the seismic trace near well and synthetic seismic record as described in some embodiments of the present disclosure, an appropriate time window size can be predicted efficiently and accurately by considering a variety of factors that affect the time window size.

The truncated synthetic seismic record 452 refers to a partial synthetic seismic record after truncating; the truncated seismic trace near well 452 refers to a partial seismic trace near well after truncating.

In some embodiments, the processor may choose a Gaussian time window with a time window size of N and a standard deviation of σ to generate the truncated synthetic seismic record 451 and the truncated seismic trace near well 452 by truncating the synthetic seismic record 441 and the seismic trace near well 442, respectively, through a formula (7).

$$\widetilde{Seis}_t(k) = Seis(k) \times \frac{1}{\sigma\sqrt{2\pi}} e^{\left(-\frac{[(k-t)-u]^2}{2\sigma^2}\right)} \quad (7)$$

$$\widetilde{Syn}_t(k) = Syn(k) \times \frac{1}{\sigma\sqrt{2\pi}} e^{\left(-\frac{[(k-t)-u]^2}{2\sigma^2}\right)},$$

wherein $\widetilde{Seis}_t(k)$ denotes the truncated seismic trace near well obtained after truncating the seismic trace near well Seis(t) using the Gaussian time window after the first data processing, $\widetilde{Syn}_t(k)$ denotes the truncated synthetic seismic record obtained after truncating the synthetic seismic record Syn(t) using the Gaussian time window, σ denotes the standard deviation, t denotes a time with a value range of [1, M], and relevant description of M may be found in the formula (5); N denotes the time window size, k denotes a count of sampling points of the time window, and a value range of k is $$\left[t - \frac{1}{2}N, \ t + \frac{1}{2}N\right].$$

The geological stratification in the depth domain 461 refers to geological stratification expressed in space, such as geological stratification at different depths at a same time. The geological stratification in the time domain 462 refers to geological stratification expressed in time, such as geological stratification at a same depth at different times. More on the geological stratification may be found in FIG. 2 and related descriptions thereof.

In some embodiments, the processor may convert the geologic stratification in the depth domain 461 to geologic stratification in the time domain 462. A specific way of conversion may be found in the aforementioned way based on the acoustic time difference logging information by calculating the correspondence between the depth domain and the time domain through the formula (15).

The seismic horizon 470 refers to a seismic synoptic axis corresponding to certain geological stratification and a plane distribution.

In some embodiments, the processor may obtain the seismic horizon 470 in a variety of ways. For example, the processor may obtain seismic layers 470 by obtaining the user input, through machine learning model(s), etc.

The amount of time deviation 480 refers to an amount of deviation in the time domain between the geological stratification and the seismic horizon 470.

In some embodiments, the processor may calculate the amount of time deviation 480 between the geologic stratification 462 in the time domain and the seismic stratification 470 through a formula (16):

$$U = \text{abs}\,(Hor_{well}(t) - Hor_{seis}(t)), \tag{16}$$

wherein $Hor_{well}(t)$ denotes a position of the geological stratification in the time domain, $Hor_{seis}(t)$ denotes a position of the seismic horizon in the time domain, and U denotes an absolute value of the time deviation between the geological stratification and the seismic horizon.

In some embodiments, the processor may determine the time shift 491 in a variety of ways. For example, the processor may randomly generate a plurality of different time shifts 491. As shown in a formula (8), a value range of the time shifts 491 may be determined based on the amount of time deviation 480. More about the time shift may be found in FIG. 2 and related descriptions thereof.

In some embodiments, the processor may calculate the correlation 492 between the truncated synthetic seismic record 451 and the truncated seismic trace near well 452 at different time shifts 491 by the formula (8), and more about the correlation 492 may be found in FIG. 2 and related descriptions thereof.

$$cor_{t,p} = \sum\nolimits_{k=t-\frac{1}{2}N}^{t+\frac{1}{2}N} \widetilde{Seis}_t(k) \times \widetilde{Syn}_{t+p}(k), \tag{8}$$

wherein $cor_{t,p}$ denotes the correlation between the truncated seismic trace near well $\widetilde{Seis}_t(k)$ and the truncated synthetic seismic record $\widetilde{Syn}_{t+p}(k)$ formed by truncating a t-th sampling point when the time shift is p, p denotes the time shift, which takes a value range of [−2U, 2U], and U denotes the amount of time deviation between the geological stratification in the time domain and the seismic horizon.

In some embodiments, the processor may obtain a maximum value of the aforementioned correlation 492 and use the corresponding time shift 491 as the global time shift 493 as shown in a formula (9):

$$\dot{Syn}(\tau) = Syn(t + p_1), \tag{9}$$

wherein $p_1$ denotes the global time shift, $\text{argmax}_p$ denotes a value of p when the function $cor_{t,p}$ obtains a maximum value.

In some embodiments, the processor may perform the preliminary alignment on the synthetic seismic record 441 based on the global time shift 493 to determine the preliminarily aligned synthetic seismic record 4100 using a formula (10):

$$\dot{Syn}(\tau) = Syn(t + p_1), \tag{10}$$

wherein $\dot{Syn}(t)$ denotes the preliminarily aligned synthetic seismic record.

By determining the sampling plan and the time window, generating the truncated synthetic seismic record and the truncated seismic trace near well, calculating the amount of time deviation between the geological stratification in the time domain and the seismic horizon, determining the correlation and the global time shift, and performing the preliminary alignment as described in some embodiments of the present disclosure, the global time shift can be obtained more accurately to facilitate a preliminary calibration of the synthetic seismic record.

Figure 5:
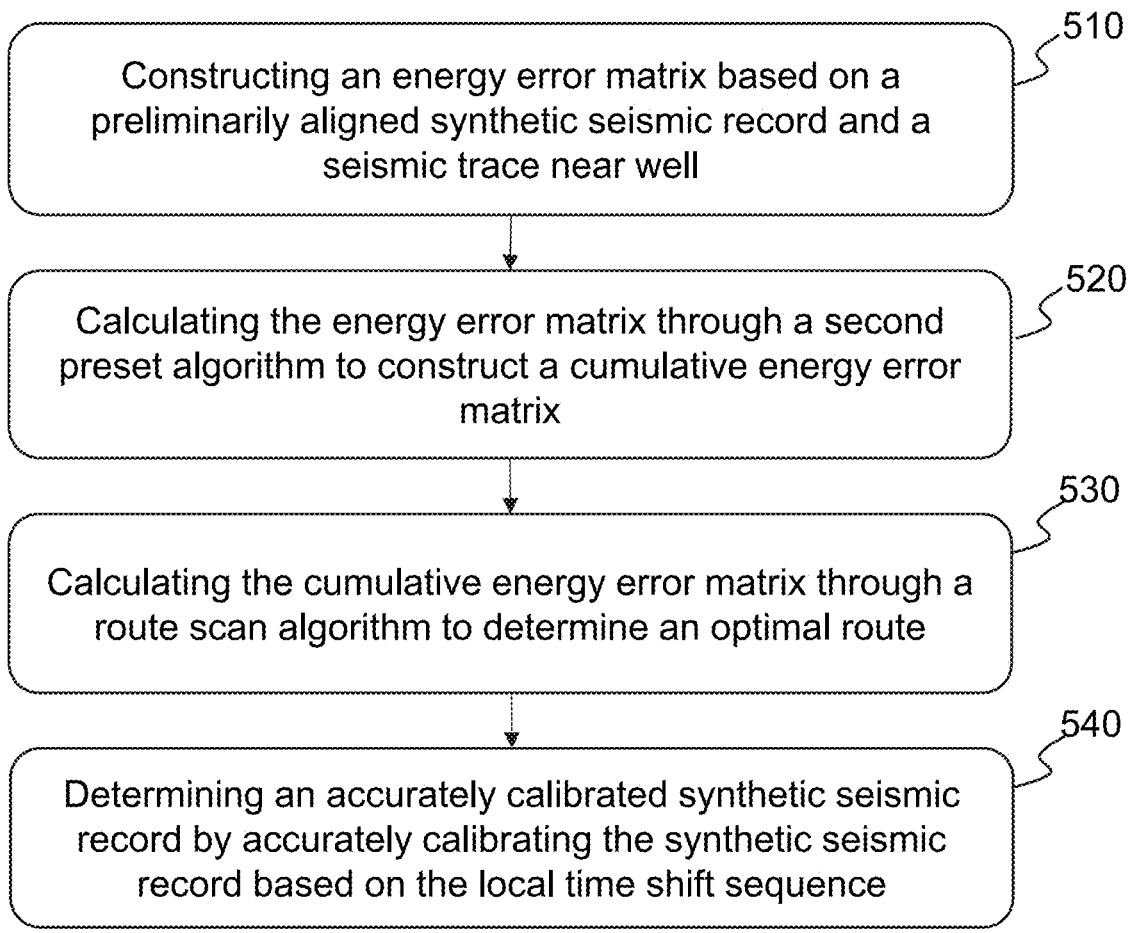
FIG. 5 is an exemplary flowchart of performing an accurate calibration on a synthetic seismic record according to some embodiments of the present disclosure.

FIG. 5 is an exemplary flowchart of performing an accurate calibration on a synthetic seismic record according to some embodiments of the present disclosure. In some embodiments, a process 500 may be executed by a processor. As shown in FIG. 5, the process 500 includes the following steps.

Step 510, constructing an energy error matrix based on a preliminarily aligned synthetic seismic record and a seismic trace near well.

The energy error matrix refers to a matrix constructed based on error energy.

In some embodiments, the processor may construct the preliminarily aligned synthetic seismic record and the seismic trace near well by a formula (11):

$$E_{l,t} = |Seis(t + l) - Syn(t)|^2, \tag{11}$$

wherein, E denotes the energy error matrix constructed based on the seismic trace near well and the synthetic seismic record, which is a two-dimensional array of (2L+1) rows and T columns, where I=[−L, . . . , −1, 0, 1, . . . , L], [t=1, . . . , T]; and $E_{l,t}$ denotes a value located at row l and column t.

Step 520, calculating the energy error matrix through a second preset algorithm to construct a cumulative energy error matrix. More about the second preset algorithm may be found in FIG. 2 and related descriptions thereof.

The cumulative energy error matrix refers to a matrix constructed by an iterative accumulation of the energy error matrix.

In some embodiments, the processor may construct the cumulative energy error matrix by performing the iterative accumulation on the energy error matrix E through route-constrained dynamic planning, as specified in an algorithm in a formula (12):

$$D_{l,t} = E_{l,t} + \min \begin{cases} D_{l-1,t-3} + \sum_{a=1}^{2} E_{l-1,t-a} \\ D_{l,t-1} \\ D_{l+1,t-3} + \sum_{a=1}^{2} E_{l+1,t-a} \end{cases}, \quad (12)$$

wherein D denotes the cumulative energy error matrix, which is a two-dimensional array of (2L+1) rows and T columns, where l=[−L, . . . , −1, 0, 1, . . . , L], [t=1, . . . , T], and $D_{l,t}$ denotes a value located at row l and column t.

Step 530, calculating the cumulative energy error matrix through a route scan algorithm to determine an optimal route.

The route scan algorithm refers to an algorithm used to determine the optimal route.

The optimal route refers to a best matching route of the cumulative energy error matrix. In some embodiments, the optimal route may be a local time shift sequence, which includes a time shift for each sample point in the synthetic seismic record.

Figure 8:
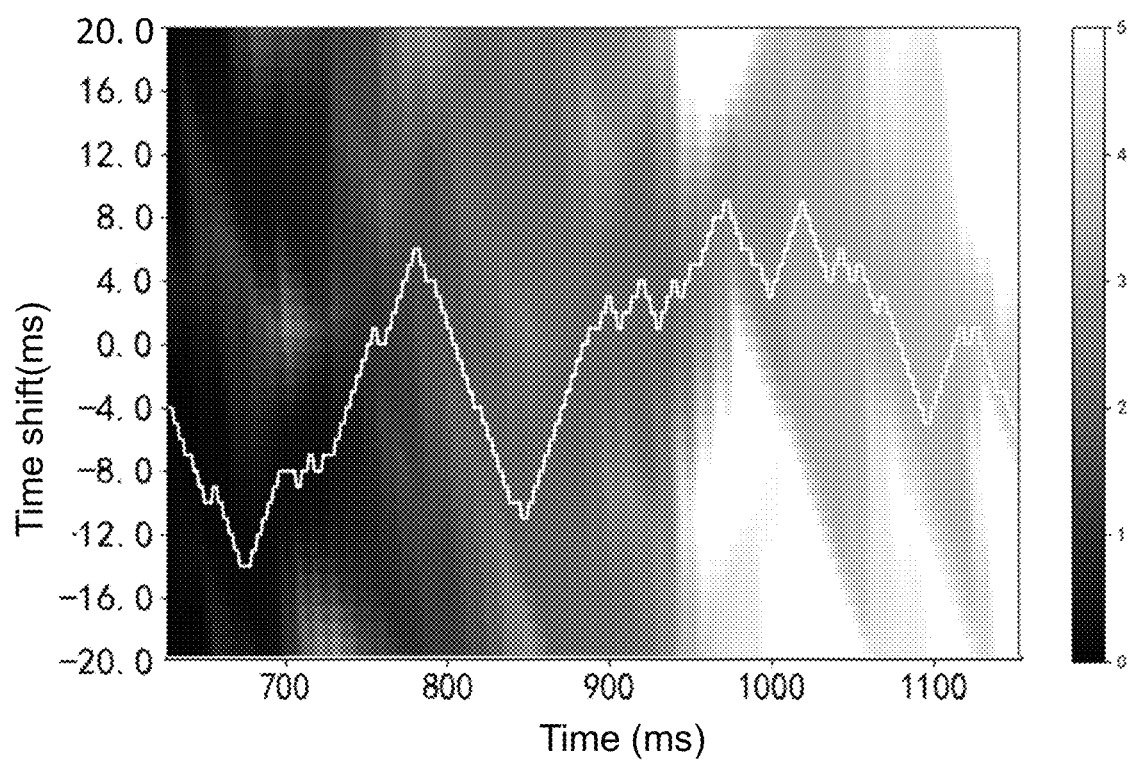
FIG. 8 is a schematic diagram of a cumulative energy error matrix constructed based on a synthetic seismic record and a seismic trace near well and a local time shift according to some embodiments of the present disclosure.

In some embodiments, as shown in FIG. 8, the processor may perform a route scan on the cumulative energy error matrix to find the optimal route, with the aforementioned route scan algorithm expressed through a formula (13):

$$q(t) = \operatorname{argmin}_l(D_{l,t}), \quad (13)$$

wherein q(t) denotes the optimal route, i.e., a sequence in which the time shift is stored, and q(t)={q(1), . . . , q(T)}, $\operatorname{argmin}_l(D_{l,t})$ denotes a value of variable l that makes the function $D_{l,t}$ minimum.

Step 540, determining an accurately calibrated synthetic seismic record by accurately calibrating the synthetic seismic record based on the local time shift sequence.

More about the accurate calibration may be found in FIG. 2 and related descriptions thereof.

In some embodiments, the processor may determine the accurately calibrated synthetic seismic record based on the local time shift sequence through a formula (14):

$$\overset{...}{Syn}(\tau) = \overset{.}{Syn}(t + q(t)), \quad (14)$$

where $\overset{...}{Syn}(t)$ denotes the accurately calibrated synthetic seismic record.

According to some embodiments of the present disclosure, by constructing the energy error matrix based on the preliminarily aligned synthetic seismic record and the seismic trace near well, constructing the cumulative energy error matrix through the second predetermined algorithm, determining the optimal route through the route scan algorithm, and accurately calibrating the synthetic seismic records based on the local time shift sequence, the accurate local time shift sequence can be determined accurately on a basis of a preliminary calibration to facilitate the accurate calibration, thereby effectively improving efficiency of a well-seismic tie and ensure high accuracy.

One or more embodiments of the present disclosure also provide a non-transitory computer-readable storage medium, wherein the storage medium stores computer instructions, and when a computer reads the computer instructions in the storage medium, the computer implements the method for an accurate well-seismic tie based on stepwise matching and optimization according to the aforementioned embodiments

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for an accurate well-seismic tie based on stepwise matching and optimization, wherein the method is implemented by a processor and comprises:
    based on seismic data and logging information, determining target seismic data as a seismic trace near well, and performing first data processing on the target seismic data;
    performing, based on a target calibration object, second data processing on the logging information to determine a reflection coefficient sequence;
    extracting seismic wavelets of the seismic trace near well, convoluting the seismic wavelets with the reflection coefficient sequence, determining a synthetic seismic record of the target calibration object in a time domain, and performing third data processing on the synthetic seismic record;
    determining, through a first preset algorithm, a correlation between the seismic trace near well and the synthetic seismic record, determining a global time shift between the synthetic seismic record and the seismic trace near well, and performing a preliminary alignment on the synthetic seismic record through the global time shift; and
    calculating a local time shift between the seismic trace near well and the synthetic seismic record through a second preset algorithm and accurately calibrating the synthetic seismic record through the local time shift.

2. The method according to claim 1, wherein the seismic data includes seismic data in the time domain, a seismic interpretation horizon, and the logging information includes at least one of sonic time difference logging information, density logging information, resistivity logging information, well coordinates, and a geological stratification.

3. The method according to claim 2, wherein the determining target seismic data as a seismic trace near well based on seismic data and logging information, and performing first data processing on the target seismic data includes:
    calculating, based on the well coordinates and nearby seismic trace coordinates, a Euclidean distance between the well coordinates and the nearby seismic trace coordinates; and
    determining the seismic trace near well based on the Euclidean distance and performing the first data processing on the seismic trace near well.

4. The method according to claim 1, wherein the performing, based on a target calibration object, second data processing on the logging information to determine a reflection coefficient sequence includes:
    preprocessing sonic time difference logging information, replacing an anomalous segment of the sonic time difference logging information, and obtaining preprocessed sonic time difference logging information;
    reconstructing density logging information, replacing an anomalous value of the density logging information, and obtaining reconstructed density logging information;
    smoothing the preprocessed sonic time difference logging information to obtain smoothed sonic time difference logging information;
    determining a longitudinal wave velocity sequence based on the smoothed sonic time difference logging information; and
    determining a reflection coefficient sequence in a depth domain based on the longitudinal wave velocity sequence and the reconstructed density logging information.

5. The method according to claim 1, wherein the extracting seismic wavelets of the seismic trace near well, convoluting the seismic wavelets with the reflection coefficient sequence, determining a synthetic seismic record of the target calibration object in a time domain, and performing third data processing on the synthetic seismic record includes:
    converting a reflection coefficient sequence in a depth domain to a reflection coefficient sequence in the time domain based on sonic time difference logging information;
    determining, through a convolution model and error energy, a seismic wavelet with minimum error energy based on the reflection coefficient sequence in the time domain and a seismic trace near well record; and
    performing a convolution calculation based on the seismic wavelet and the reflection coefficient sequence in the time domain to determine the synthetic seismic record, and performing the third data processing on the synthetic seismic record.

6. The method according to claim 1, wherein the determining, through a first preset algorithm, a correlation between the seismic trace near well and the synthetic seismic record, determining a global time shift between the synthetic seismic record and the seismic trace near well, and performing a preliminary alignment on the synthetic seismic record through the global time shift includes:

determining a sampling plan for the seismic trace near well and the synthetic seismic record and determining a time window for each sampling point in the sampling plan;

truncating the synthetic seismic record and the seismic trace near well based on the time window to generate a truncated synthetic seismic record and a truncated seismic trace near well, respectively;

converting a geological stratification in a depth domain into a geological stratification in the time domain and calculating an amount of time deviation between the geological stratification in the time domain and a seismic horizon;

determining at least one correlation between the truncated synthetic seismic record and the truncated seismic trace near well under at least one time shift, wherein a range of values for the at least one time shift is determined based on the amount of time deviation;

obtaining a time shift corresponding to a maximum correlation in the at least one correlation as the global time shift based on the correlation; and performing the preliminary alignment on the synthetic seismic record through the global time shift and determining a preliminarily aligned synthetic seismic record.

7. The method according to claim 6, wherein the determining a sampling plan for the seismic trace near well and the synthetic seismic record includes:

generating at least one candidate sampling plan, the at least one candidate sampling plan including a sampling feature for sampling each of at least one time domain subinterval;

determining, based on each of the at least one candidate sampling plan, a seismic trace near well, a seismic wavelet, and a reflection coefficient sequence corresponding to the candidate sampling plan;

determining the global time shift based on the seismic trace near well, the seismic wavelet, and the reflection coefficient sequence corresponding to the candidate sampling plan;

filtering the at least one candidate sampling plan, obtaining a first sampling plan set, and generating a first histogram distribution of global time shifts based on the global time shifts corresponding to candidate sampling plans in the first sampling plan set; and determining, based on the first sampling plan set and the first histogram distribution, a candidate sampling plan whose total downsampling rate exceeds a preset threshold and global time shift is the same as a global time shift with a highest frequency in the first histogram distribution in the first sampling plan set as the sampling plan.

8. The method according to claim 6, wherein determining the time window includes:

determining, through a time window determination model, a size of the time window based on the seismic trace near well and the synthetic seismic record, the time window determination model being a machine learning model.

9. The method according to claim 8, wherein the time window determination model includes a first embedding layer, a second embedding layer, and a determination layer, and the determining, through a time window determination model, a size of the time window includes:

determining, based on the seismic trace near well, a first embedding vector through the first embedding layer;

determining, based on the synthetic seismic record, a second embedding vector through the second embedding layer; and determining, based on the first embedding vector and the second embedding vector, the size of the time window through the determination layer.

10. The method according to claim 9, wherein an input of the determination layer further includes a total downsampling rate of a sampling plan for a sampling point corresponding to the time window and a dispersion degree of downsampling rates of a plurality of time domain subintervals.

11. The method according to claim 8, wherein the size of the time window further includes an adjustment value, and the adjustment value is determined based on an interval downsampling rate of a time domain interval to which a sampling point corresponding to the time window belongs.

12. The method according to claim 1, wherein the calculating a local time shift between the seismic trace near well and the synthetic seismic record through a second preset algorithm and accurately calibrating the synthetic seismic record through the local time shift includes:

constructing an energy error matrix based on a preliminarily aligned synthetic seismic record and the seismic trace near well;

calculating the energy error matrix through the second preset algorithm to construct a cumulative energy error matrix;

calculating the cumulative energy error matrix through a route scan algorithm to determine an optimal route, wherein the optimal route is a local time shift sequence and includes a time shift of each sample point in the synthetic seismic record; and determining an accurately calibrated synthetic seismic record by accurately calibrating the synthetic seismic record based on the local time shift sequence.

13. A non-transitory computer-readable storage medium, wherein the storage medium stores computer instructions, and when a computer reads the computer instructions in the storage medium, the computer implements the method according to claim 1.

14. A system for an accurate well-seismic tie based on stepwise matching and optimization, comprising:

based on seismic data and logging information, a first determination module configured to determine target seismic data as a seismic trace near well and perform first data processing on the target seismic data;

a second determination module configured to perform, based on a target calibration object, second data processing on the logging information to determine a reflection coefficient sequence;

a third determination module configured to extract seismic wavelets of the seismic trace near well, convoluting the seismic wavelets with the reflection coefficient sequence, determine a synthetic seismic record of the target calibration object in a time domain, and perform third data processing on the synthetic seismic record;

a preliminary alignment module configured to determine, through a first preset algorithm, a correlation between the seismic trace near well and the synthetic seismic record, determine a global time shift between the synthetic seismic record and the seismic trace near well, and perform a preliminary alignment on the synthetic seismic record through the global time shift; and an accurate calibration module configured to calculate a local time shift between the seismic trace near well and the synthetic seismic record through a second preset algorithm and accurately calibrate the synthetic seismic record through the local time shift.

15. The system according to claim 14, wherein the first determination module is further configured to:
   calculate, based on the well coordinates and nearby seismic trace coordinates, a Euclidean distance between the well coordinates and the nearby seismic trace coordinates; and
   determine the seismic trace near well based on the Euclidean distance and perform the first data processing on the seismic trace near well.

16. The system according to claim 14, wherein the second determination module is further configured to:
   preprocess sonic time difference logging information, replace an anomalous segment of the sonic time difference logging information, and obtain preprocessed sonic time difference logging information;
   reconstruct density logging information, replace an anomalous value of the density logging information, and obtain reconstructed density logging information;
   smooth the preprocessed sonic time difference logging information to obtain smoothed sonic time difference logging information;
   determine a longitudinal wave velocity sequence based on the smoothed sonic time difference logging information; and
   determine a reflection coefficient sequence in a depth domain based on the longitudinal wave velocity sequence and the reconstructed density logging information.

17. The system according to claim 14, wherein the third determination module is further configured to:
   convert a reflection coefficient sequence in a depth domain to a reflection coefficient sequence in the time domain based on sonic time difference logging information;
   determine, through a convolution model and error energy, a seismic wavelet with minimum error energy based on the reflection coefficient sequence in the time domain and a seismic trace near well record; and
   perform a convolution calculation based on the seismic wavelet and the reflection coefficient sequence in the time domain to determine the synthetic seismic record, and perform the third data processing on the synthetic seismic record.

18. The system according to claim 14, wherein the preliminary alignment module is further configured to:
   determine a sampling plan for the seismic trace near well and the synthetic seismic record and determine a time window for each sampling point in the sampling plan;
   truncate the synthetic seismic record and the seismic trace near well based on the time window to generate a truncated synthetic seismic record and a truncated seismic trace near well, respectively;
   convert a geological stratification in a depth domain into a geological stratification in the time domain and calculate an amount of time deviation between the geological stratification in the time domain and a seismic horizon;
   determine at least one correlation between the truncated synthetic seismic record and the truncated seismic trace near well under at least one time shift, wherein a range of values for the at least one time shift is determined based on the amount of time deviation;
   obtain a time shift corresponding to a maximum correlation in the at least one correlation as the global time shift based on the correlation; and
   perform the preliminary alignment on the synthetic seismic record through the global time shift and determine a preliminarily aligned synthetic seismic record.

19. The system according to claim 18, wherein the preliminary alignment module is further configured to:
   generate at least one candidate sampling plan, the at least one candidate sampling plan including a sampling feature for sampling each of at least one time domain subinterval;
   determine, based on each of the at least one candidate sampling plan, a seismic trace near well, a seismic wavelet, and a reflection coefficient sequence corresponding to the candidate sampling plan;
   determine the global time shift based on the seismic trace near well, the seismic wavelet, and the reflection coefficient sequence corresponding to the candidate sampling plan;
   filter the at least one candidate sampling plan, obtain a first sampling plan set, and generate a first histogram distribution of global time shifts based on the global time shifts corresponding to candidate sampling plans in the first sampling plan set; and
   determine, based on the first sampling plan set and the first histogram distribution, a candidate sampling plan whose total downsampling rate exceeds a preset threshold and global time shift is the same as a global time shift with a highest frequency in the first histogram distribution in the first sampling plan set as the sampling plan.

20. The system according to claim 14, wherein the accurate calibration module is further configured to:
   construct an energy error matrix based on a preliminarily aligned synthetic seismic record and the seismic trace near well;
   calculate the energy error matrix through the second preset algorithm to construct a cumulative energy error matrix;
   calculate the cumulative energy error matrix through a route scan algorithm to determine an optimal route, wherein the optimal route is a local time shift sequence and includes a time shift of each sample point in the synthetic seismic record; and
   determine an accurately calibrated synthetic seismic record by accurately calibrating the synthetic seismic record based on the local time shift sequence.

* * * * *